No. 733,562. PATENTED JULY 14, 1903.
A. SUNDH.
ELECTROHYDRAULIC CONTROLLER FOR ELECTRIC MOTORS.
APPLICATION FILED JULY 11, 1902.
NO MODEL. 4 SHEETS—SHEET 1.

WITNESSES: August Sundh INVENTOR
Walter Scott
Marie M. Hovey
BY H. S. Mackaye
ATTORNEY No. 733,562. PATENTED JULY 14, 1903.
A. SUNDH.
ELECTROHYDRAULIC CONTROLLER FOR ELECTRIC MOTORS.
APPLICATION FILED JULY 11, 1902.
NO MODEL. 4 SHEETS—SHEET 2.

WITNESSES:
Walter Scott
Marie M. Hovey

August Sundh INVENTOR

BY H. S. Mackaye
ATTORNEY

No. 733,562. PATENTED JULY 14, 1903.
A. SUNDH.
ELECTROHYDRAULIC CONTROLLER FOR ELECTRIC MOTORS.
APPLICATION FILED JULY 11, 1902.
NO MODEL. 4 SHEETS—SHEET 3.

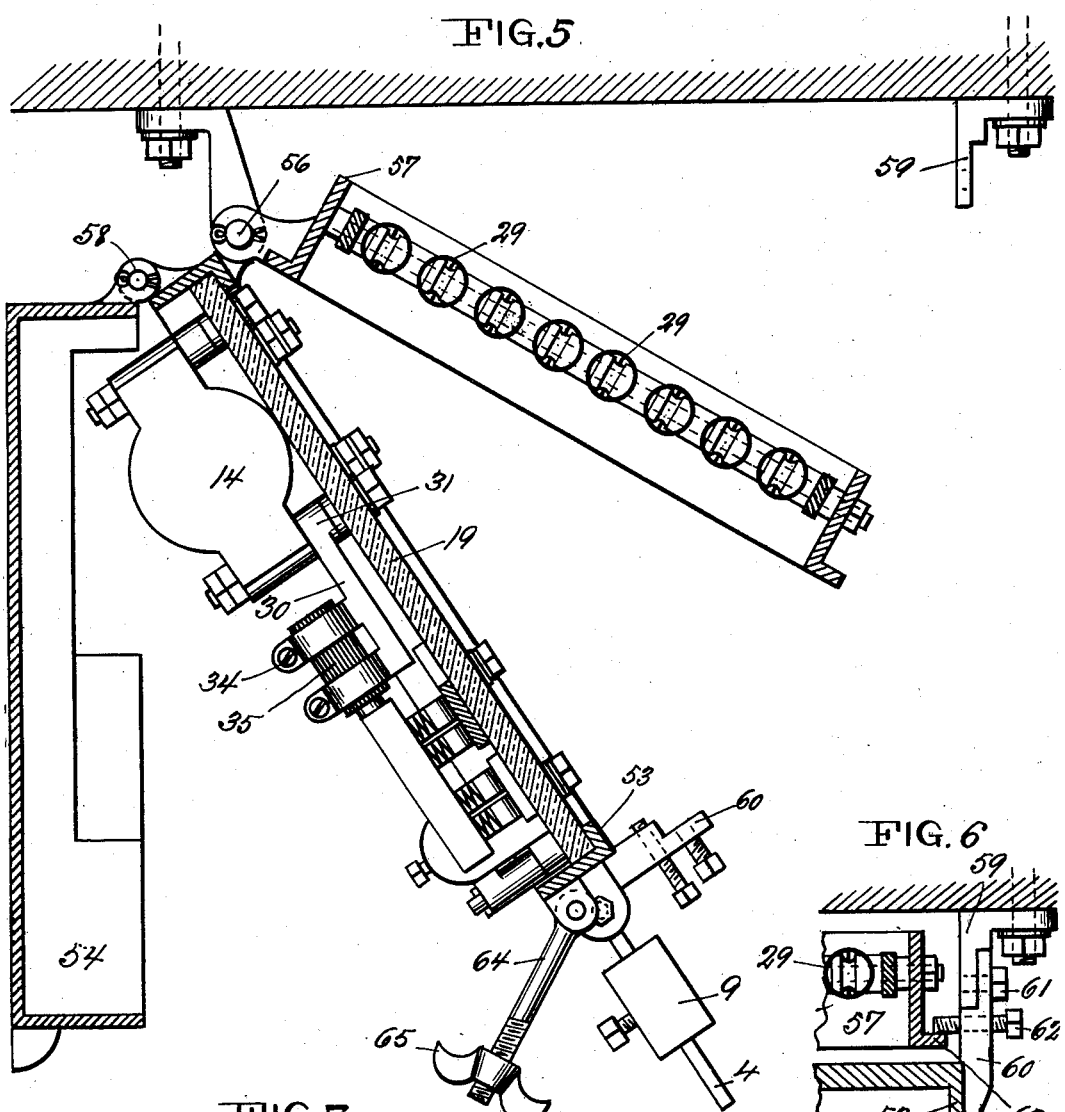

No. 733,562. Patented July 14, 1903.

UNITED STATES PATENT OFFICE.

AUGUST SUNDH, OF YONKERS, NEW YORK.

ELECTROHYDRAULIC CONTROLLER FOR ELECTRIC MOTORS.

SPECIFICATION forming part of Letters Patent No. 733,562, dated July 14, 1903.

Application filed July 11, 1902. Serial No. 115,178. (No model.)

*To all whom it may concern:*

Be it known that I, AUGUST SUNDH, a citizen of the United States, residing in Yonkers, in the county of Westchester and State of New York, have invented a certain new and useful Improvement in Electrohydraulic Controllers for Electric Motors, of which the following is a specification.

This invention has relation to devices intended to be operated by a primary electric current from a distance whether by hand or automatically in obedience to prearranged changes in other devices.

The main objects of this invention are the following: the provision of means whereby a relatively light current in a primary circuit is enabled to set into operation hydraulic means of considerable power for operating the devices which immediately control the circuits of the motor in question; the provision of a device of the class just described which shall operate in obedience to changes in pressure in the pipes supplying the aforesaid hydraulic devices, and therefore adapted to control an electric motor running a pump feeding said pipes; the provision of a device of this character wherein the rapidity of the operation of the motor-controller may be regulated at will without interfering with the electric circuits; the provision of means of the above class wherein the motor is started by a gradual movement of its controlling devices, while on stopping the motor the circuit thereof is more rapidly interrupted; and in general the provision of means of this character of a compact nature, yet enabling all the elements thereof to be available and accessible for repairs with the least possible difficulty or delay.

My present invention is illustrated in one preferred embodiment in the accompanying drawings, wherein—

Figure 1:
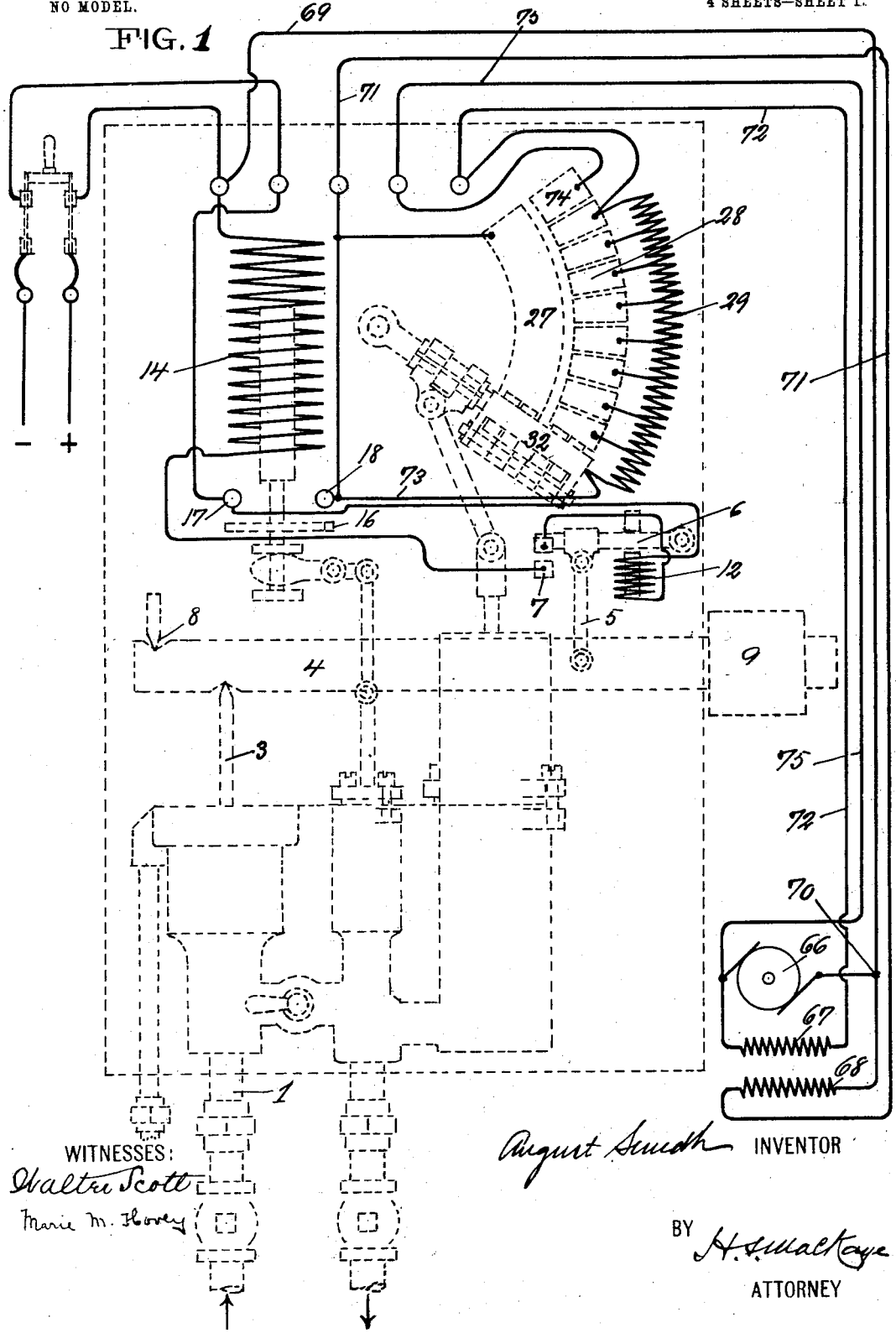
Figure 2:
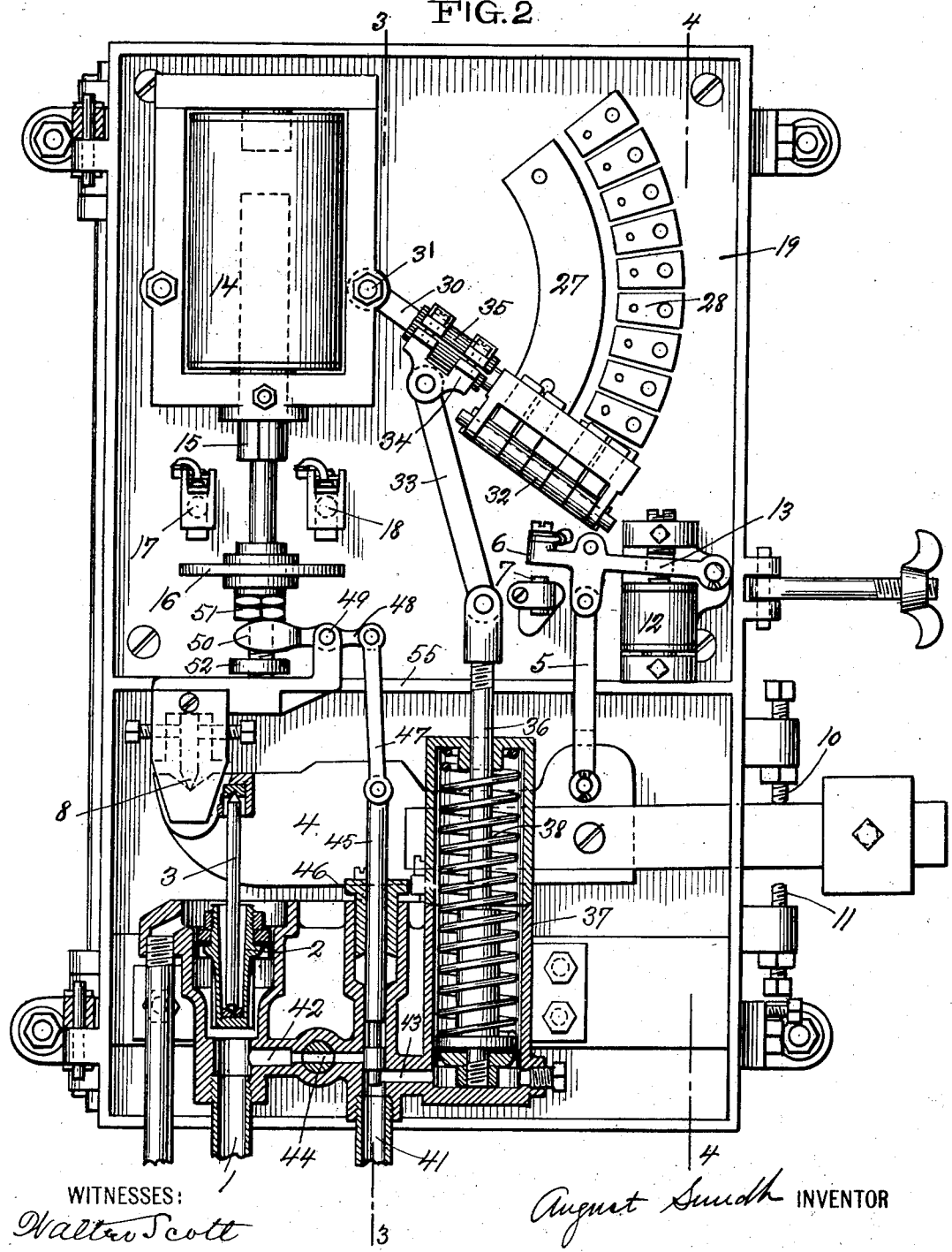
Figure 3:
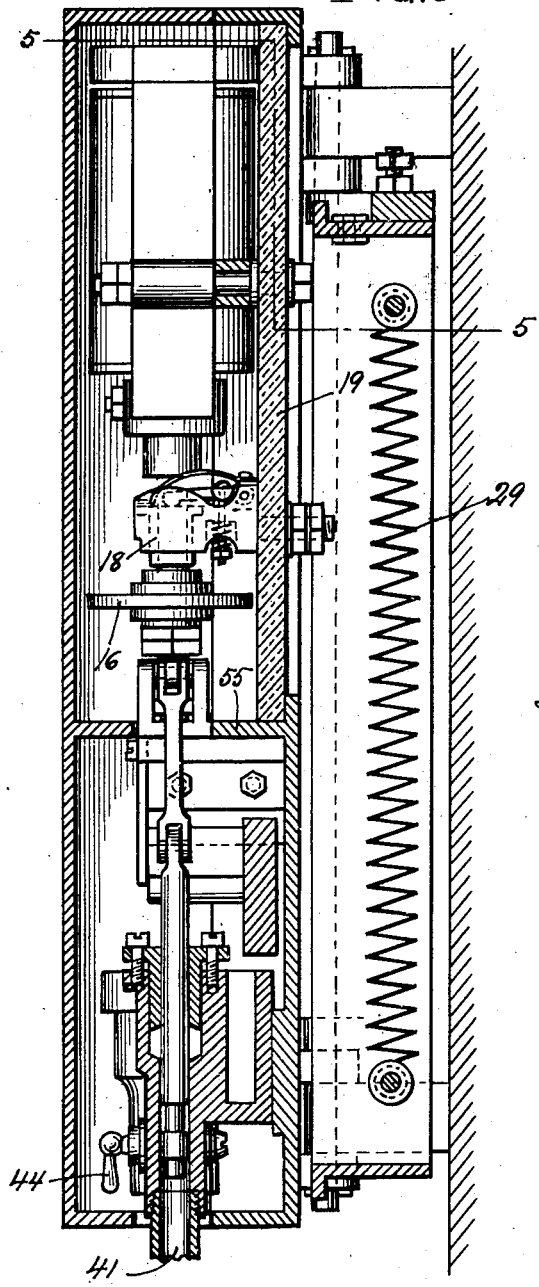
Figure 4:
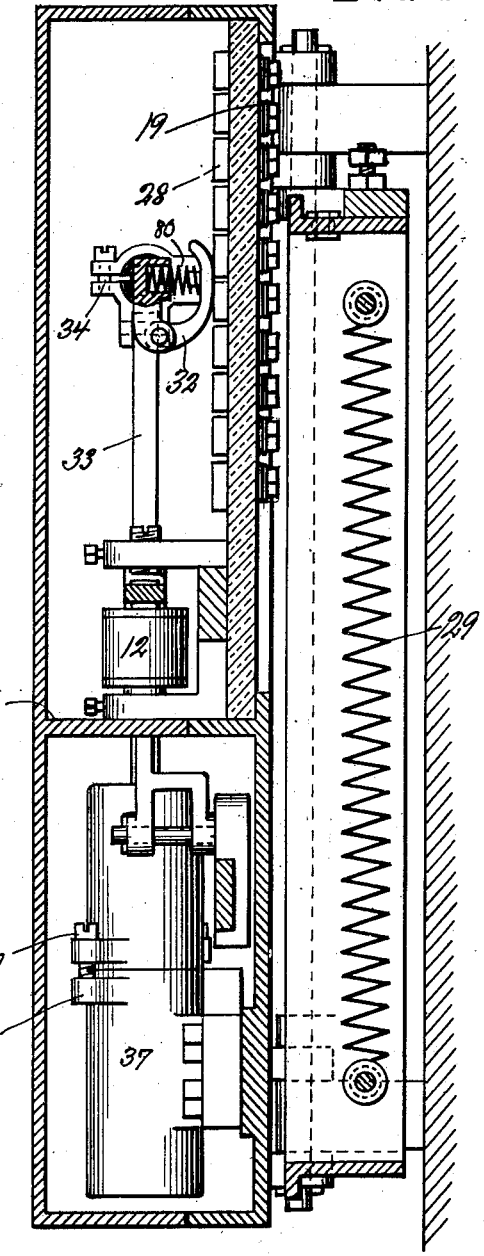

Figure 1 is a diagrammatic view of the circuits employed in the control of a compound-wound motor by my invention. Fig. 2 is a front view of the mechanical agencies employed therein, some of the parts being shown in section. Fig. 3 is a sectional view of the same on the line 3 3 of Fig. 2. Fig. 4 is a sectional view of the same on the line 4 4 of Fig. 2. Fig. 5 is a top view of the same, showing the positions of the various parts when opened for inspection or repairs. Fig. 6 is a sectional view of a detail, and Figs. 7 and 8 are respectively a top and a side view of the main preliminary circuit-closer contacts preferably employed by me.

While certain features of my invention are suitable for use with circuit-closers at a distance, as heretofore stated, I have shown the same in my preferred embodiment as constructed to carry out the requirements of an automatic regulating system wherein a motor is stopped and started in correspondence with changes in the hydraulic pressure present at any time in certain water pipes.

It will be understood that this system may be applied to air-pressure instalments, if desired, without departing from my invention, and the term "hydraulic" employed in the title is not to be understood as limiting my claims to a device wherein water is necessarily the operating fluid.

In the embodiment shown, then, the fluid under pressure is supplied to the pipe 1, acting upon a plunger 2 or equivalent device, which in turn acts through the rod 3 and lever 4 and link 5 to open and close circuit by moving the lever 6 away from or against the terminal 7. The lever 4 is fulcrumed at 8, and the weight 9 or its equivalent is used to push said lever down against the action of the rod 3, while the lever is thus made to play between the adjustable stops 10 and 11 as the pressure in the pipe 1 changes. An electromagnet 12 acts upon an armature, as 13, on the lever 6, tending when circuit is closed at 7 to hold the lever 6 down. In the circuit which is opened and closed at 7 are placed the coils of a solenoid 14, within which is a core 15, carrying a metal cross-piece 16, which when raised bridges between the terminals 17 and 18. These are the main circuit-terminals, whereby the current for actuating the motor is first admitted. The preferred construction of these terminals 17 and 18 is shown in Figs. 7 and 8. The main supporting-slab 19 carries the metallic frames 20, which are fastened in place by the screws 21. The contact-terminals 22, preferably of carbon, work up and down in appropriate chambers in the outer ends of the frames 20, while a lever 23 presses down upon the top of each contact-terminal 22 under the influence of a spring 24, the force of which can be regulated by the bearing-nut 25. For greater certainty the electric cables 26 carry current directly to a point of attachment 27 on each contact-terminal. This arrangement of the terminals 17 and 18 insures easy replacement of the carbon contacts and allows for lost motion when the bridging-piece 16 is raised. The main motor-circuit being closed at 17 and 18 by raising the bridging-piece 16, the further changes in circuit necessary for speeding up are controlled as follows: As shown in Fig. 2, a continuous curved metallic terminal 27 is placed concentrically with a series of terminals 28, which latter are appropriately connected in a well-known manner with the resistance-coils 29, placed behind the slab 19. An arm 30, pivoted at 31, carries brushes 32, serving to bridge from the terminal 27 to one after the other of the terminals 28 as they move over them. Each of said brushes, as shown in Fig. 4, is pivoted to said arm and provided with a helical spring 80, entering and secured in a recess in said arm, which spring keeps the brush in elastic contact with the terminals 28. A pitman 33 is pivoted to an attaching-socket 34, clasping said arm 30 over insulation 35. The lower end of the pitman 33 is pivoted to the upper extremity of the rod 36, which enters the top of the cylinder 37. Within this cylinder and at the end of the rod 36 there is placed a tight plunger, and a spring 38 is provided, so formed and located as to tend constantly to press said plunger and rod downward. As shown in Figs. 2 and 4, the cylinder 37 is made in two parts, each provided with lugs 39, and these parts are secured together by means of screws 40 passing through said lugs. This construction facilitates proper adjustment of the parts contained in the cylinder and repairs thereof. An outlet-pipe 41 communicates with a vertical valve-chamber above it, which latter opens on one side by the pipe 42 into the pressure-pipe 1 and on the opposite side by the pipe 43 into the space beneath the plunger in 37. The pipe 42 is commanded by the manually-controlled valve 44, whereby it can be entirely closed, if desired. Within the valve-chamber above the pipe 41 there slides a plunger-valve 45, passing through a proper stuffing-box 46. A pitman 47 is pivoted to the top of 45 and to one end of the lever 48, fulcrumed at 49. The opposite end of this last-named lever passes between the abutments 51 and 52, carried by the lower end of the solenoid-core 15, beneath the bridging-piece 16. On raising the solenoid the lever 48 is operated, so as to push down the valve 45 and open communication between the pipes 42 and 43. When, on the contrary, the core 15 falls into the position shown in Fig. 1, the valve-rod 45 is raised and the valve thus closed, while the fluid previously admitted beneath the plunger finds its way out at 41. It will thus be evident that when the solenoid-core is raised fluid-pressure raises the plunger in the cylinder 37, the speed of this movement being regulated at will by the degree to which the manual valve 44 is opened. On the fall of the core 15 the fluid escapes and the spring 38 returns the plunger to its lowermost position. Thus a movement up and down of the brushes 32 is produced, gradual when in the upward direction, but more rapid when the motor-circuit is broken and the brushes move downward.

The general arrangement of the mechanical parts of my preferred device is shown in top view in Fig. 5. The slab 19 and all the mechanisms mounted thereon are inclosed in an iron or other frame 53, upon which a cover 54 is adapted to be fitted. An inclosing box is thus produced, wherein the hydraulic portions are confined below the middle horizontal partition 55 and the electrical devices are placed in the section of the box above said partition. Appropriate openings are supplied in said partition along the line of junction of its two parts or elsewhere, through which extend the pitman 47, the rod 36, and the connecting-link 5. The slab 19 and its section of the inclosing box are pivoted or hinged, as at 56, and on the same support is hinged the frame 57, wherein are carried the resistance-wires 29. The cover 54 is hinged to the main section 53, as at 58. Thus the three divisions of the apparatus can be separated, and all parts thereof can be easily gotten at, as shown in Fig. 5. Upon the foundation which carries the whole is placed an angle-iron 59, upon which there fits the locking-plate 60, in the manner shown in Fig. 6, when the whole apparatus is in normal working position. The bolt 61 or equivalent means serves to lock the frame 53 in place by securing the plates 59 and 60 to one another. A longer bolt 62 also passes through the plate 60 nearer its point of attachment to 53, which bolt is adapted to engage behind the flange 63 on the edge of the frame 57. By this means the frames 53 and 57 are locked together independently of the fastening of either or both to 59, and the two can be swung outward together upon the common pivot 56. An ordinary swivel 64 and butterfly-nut 65 are attached to 53 for fastening the cover 54 in place.

The operation of this form of my device is as follows: For the purposes of illustration it is assumed that the pressure in the pipe 1 is produced by a pump run by an electric motor having an armature 66, a series field-magnet coil 67, and a shunt-coil 68, the circuits for operation of the same being arranged substantially as shown in Fig. 1. It is of course to be understood that various forms of motor may be used and the wiring may differ greatly from that shown in Fig. 1 without departing from my invention. Indeed, certain features of my invention are independent of the use of an electric motor at all. Assuming the motor to stand still and the pressure in the pipe 1 to be falling, the position of parts indicated in dotted lines in Fig. 1 will result. As the pressure in 1 falls the rod 3 will sink until at length circuit is closed at 7 through the magnet 12 and solenoid 14. The magnet 12 will tend to reinforce the contact at 7 and prevent difficulties arising through possible vibrations or other accidental agencies. The solenoid 14 will raise the core 15 and close circuit across from 17 to 18, at the same time opening the communication between pipes 1 and 43 and causing the pressure of fluid under the plunger in the cylinder 37 to raise said plunger and gradually move the brushes 32. Closure of circuit at 17 18 starts the motor by sending current as follows: by wire 69 to the motor at the point 70. One branch passes from here, through the shunt-coil 68 and by wire 71, to terminal 18, bridging-piece 16, terminal 17, and out. The second branch from 70 passes through the armature 66, series coils 67, wire 72, through all resistances 29, and either by safety-wire 73 or across by brushes 32 to plate 27, to wire 71, and by terminal 18 out to the mains. This condition is maintained while the plunger acts to raise the arm 30 and diminish the resistance in the armature-circuit, until at length when full speed is to be attained the brushes reach the plate 74 and the series field-coils are cut out, the armature-current finding its way out by the wire 75 and plate 74. The pump-motor thus actuated creates a rising pressure in the pipe 1, which tends to open circuit at 7. This tendency is at first resisted by the armature and magnet 12, so that very slight fluctuations in pressure are not permitted to affect the operation. Moreover, when at length the rising pressure acts to open circuit again at 7 the magnet lets go with a snap, and the duration of any arc which may be formed at 7 is very short. As soon as circuit is thus opened at 7 the core 15 falls, the valve 45 is raised, and the arm 30 brings the brushes 32 back into the position shown in Fig. 1.

A great variety of modifications may be made in this device by the exertion of the skill of the calling without departing from my invention, and I am not to be understood as limiting myself to the details herein shown and described.

What I claim is—

1. An electromagnet, a switch in circuit therewith, means for controlling said switch by fluid-pressure, an armature for said electromagnet, a circuit-closer carried by said armature, a series of resistances in circuit with said circuit-closer, a fluid-pressure-actuated device for varying said resistances and a valve controlling said fluid-pressure-actuated device and itself controlled by said armature.

2. An electromagnet, an armature therefor, a switch controlled by fluid-pressure for closing circuit through said magnet, a series of resistances, a circuit-closer controlled by said armature and in circuit with said resistances, and means also actuated by fluid-pressure for cutting said resistances into or out of said circuit.

3. The combination of a circuit-closing-switch armature, an electromagnet in circuit with and controlling said armature and a mechanism actuated by fluid-pressure linked to said armature; the said electromagnet being constructed and arranged to dampen when energized the impressed vibrations of said mechanism.

4. The combination with an electromagnet, and a circuit-closer actuated thereby of a second electromagnet an armature therefor, a contact in the path of said armature and means for mechanically actuating said armature to close circuit through said contact, said armature and both electromagnets.

5. In a controlling means for electric circuits, a hinged casing and a switch and operating devices therefor in said casing; in combination with a frame hinged concentrically with said casing, resistance-coils in said frame and connections between said coils and said switch.

6. In a device of the class described, a hinged casing and a switch and operating devices therefor within said casing; in combination with a frame hinged concentrically with said casing, resistance-coils in said frame and locking means for securing said casing and frame together.

7. In a device of the class described, a casing, a cover therefor hinged thereto, a switch and operating devices therefor within said casing and a middle partition dividing said casing and said cover into two parts.

8. In a controller for electric circuits comprising electric and hydraulic means adapted to coöperate, a casing divided into two parts by a middle partition separating said electric from said hydraulic elements.

9. In a device of the class described, a switch, operating means therefor, a casing for said switch and means, a pivotal support for said casing, resistance-coils, a frame supporting said coils hinged to said pivotal support and a cover hinged to said casing.

10. In a controller for electric circuits comprising electric and hydraulic means adapted to coöperate, a casing, a cover hinged thereto and a middle partition in two parts respectively attached to said casing and cover and uniting to divide the electrical from the hydraulic elements of said controller.

11. In a device of the class described, a hinged casing having a locking-plate on its edge, a frame hinged concentrically with said casing and two bolts passing through said locking-plate, one adapted to engage with said frame and the other to lock the casing in normal position.

12. In a device of the class described, a switch and hydraulic means for moving the same; in combination with an inlet-pipe for said means, a manual valve controlling said pipe and an automatic valve between said manual valve and said hydraulic means.

13. In a device of the class described, a switch and hydraulic means for operating the same; in combination with an inlet-pipe for said means and two controlling-valves in said pipe one of which is adapted for manual control and the other of which is adapted to be operated automatically.

14. In a device of the class described, a solenoid a core operated thereby, circuit-closing means on said core, a pivoted lever having one end engaged by abutments on said core and the other end pivoted to a valve, a switch and hydraulic means for operating the same controlled by said valve.

15. In a device of the class described, a casing in two compartments divided by a partition, a solenoid and core, a switch and a circuit-closer on said core all in one of said compartments, a cylinder and piston and a valve controlling the same in the other compartment and means for respectively connecting said valve and core and said piston and switch passing through said partition.

AUGUST SUNDH.

Witnesses:
H. S. MacKAYE,
EDWARD C. ROWLAND.